(12) United States Patent
Zhou et al.

(10) Patent No.: US 11,352,262 B2
(45) Date of Patent: Jun. 7, 2022

(54) METHODS FOR AUTOMATIC FILLING, CHARGING AND DISPENSING CARBON DIOXIDE SNOW BLOCK

(71) Applicants: Ying Zhou, Naperville, IL (US); Ranko Bursac, Libertyville, IL (US); Robert Sever, Northbrook, IL (US)

(72) Inventors: Ying Zhou, Naperville, IL (US); Ranko Bursac, Libertyville, IL (US); Robert Sever, Northbrook, IL (US)

(73) Assignee: Praxair Technology, Inc., Danbury, CT (US)

( * ) Notice: Subject to any disclaimer, the term of this patent is extended or adjusted under 35 U.S.C. 154(b) by 531 days.

(21) Appl. No.: 16/221,906

(22) Filed: Dec. 17, 2018

(65) Prior Publication Data

US 2019/0185327 A1    Jun. 20, 2019

Related U.S. Application Data

(60) Provisional application No. 62/599,949, filed on Dec. 18, 2017.

(51) Int. Cl.
*F25J 1/00*     (2006.01)
*C01B 32/55*   (2017.01)
(Continued)

(52) U.S. Cl.
CPC .................. *C01B 32/55* (2017.08); *A61J 1/00* (2013.01); *F17C 6/00* (2013.01); *F25D 3/12* (2013.01);
(Continued)

(58) Field of Classification Search
CPC ...... F17C 2225/0176; F17C 2223/0176; F17C 2223/0138; F17C 2203/0668;
(Continued)

(56) References Cited

U.S. PATENT DOCUMENTS 1,713,348 A    5/1929  O'Brien
1,770,944 A    7/1930  Payson
(Continued)

FOREIGN PATENT DOCUMENTS

CN    106386786 A    2/2017
DE    10129217 A1    1/2003
(Continued)

OTHER PUBLICATIONS https://www.savsu.com/new-index/#evo-80c; EVO—80'C "dry ice".

*Primary Examiner* — Brian M King
(74) *Attorney, Agent, or Firm* — Nilay S. Dalal (57) ABSTRACT

A method for automatically dispensing and vending carbon dioxide (CO2) snow block is disclosed. The automatic dispensing system contains multiple containers of different volumes. A user can input the volume of CO2 snow block into a controller, such as a programmable logic controller (PLC). The controller uses the inputted volume and process information to determine which container to utilize for the automated filling process. The controller can configure the selected container into a filling orientation into which liquid CO2 can flow to generate CO2 snow block. Upon detection of the completion of the fill, the container is configured into a dispensing orientation from which the CO2 snow block is released into an access region from which the user can retrieve the CO2 snow block. The control methodology may also be used to auto charge a single container located within a charging station as disclosed herein.

19 Claims, 7 Drawing Sheets (51) Int. Cl.
  *F25D 3/12* (2006.01)
  *F17C 6/00* (2006.01)
  *A61J 1/00* (2006.01)

(52) U.S. Cl.
  CPC ..... *F25J 1/0027* (2013.01); *F17C 2203/0668* (2013.01); *F17C 2221/013* (2013.01); *F17C 2223/0138* (2013.01); *F17C 2223/0176* (2013.01); *F17C 2223/033* (2013.01); *F17C 2225/0176* (2013.01)

(58) Field of Classification Search
  CPC ...... F17C 2221/013; F17C 6/00; C01B 32/55; F25J 1/0027
  See application file for complete search history.

(56) References Cited

U.S. PATENT DOCUMENTS

| | | | |
|---|---|---|---|
| 3,178,903 A | 4/1965 | Proctor | |
| 3,667,242 A | 6/1972 | Kilburn | |
| 3,810,367 A | 5/1974 | Peterson | |
| 3,875,754 A | 4/1975 | Faust et al. | |
| 4,131,450 A | 12/1978 | Saito et al. | |
| 4,170,320 A | 10/1979 | Eager | |
| 4,191,028 A | 3/1980 | Audet et al. | |
| 4,206,616 A | 6/1980 | Frank et al. | |
| 4,262,494 A | 4/1981 | Karow, Jr. | |
| 4,429,542 A | 2/1984 | Sakao et al. | |
| 4,580,409 A | 4/1986 | Angelier et al. | |
| 4,597,266 A | 7/1986 | Entrekin | |
| 4,783,973 A | 11/1988 | Angelier et al. | |
| 4,799,358 A | 1/1989 | Knopf et al. | |
| 4,821,914 A | 4/1989 | Owen et al. | |
| 4,916,922 A | 4/1990 | Mullens | |
| 4,974,423 A | 12/1990 | Pring | |
| 5,105,627 A | 4/1992 | Kurita | |
| 5,257,503 A | 11/1993 | Rhoades et al. | |
| 5,355,684 A | 10/1994 | Guice | |
| 5,434,045 A | 7/1995 | Jost | |
| 5,511,379 A | 4/1996 | Gibot et al. | |
| 5,528,907 A | 6/1996 | Pint et al. | |
| 5,548,974 A * | 8/1996 | Rhoades | C01B 32/55 62/165 |
| 5,647,226 A | 7/1997 | Scaringe et al. | |
| 5,924,302 A | 7/1999 | Derifield | |
| 5,993,165 A | 11/1999 | Lorimer et al. | |
| 6,044,650 A | 4/2000 | Cook et al. | |
| 6,119,465 A | 9/2000 | Mullens et al. | |
| 6,131,404 A | 10/2000 | Hase et al. | |
| 6,141,985 A | 11/2000 | Cluzeau et al. | |
| 6,209,341 B1 | 4/2001 | Benedetti et al. | |
| 6,209,343 B1 | 4/2001 | Owen | |
| 6,347,525 B2 | 2/2002 | Cosman | |
| 6,457,323 B1 | 10/2002 | Marotta | |
| 6,467,642 B2 | 10/2002 | Mullens et al. | |
| 6,584,802 B1 | 7/2003 | Cofield et al. | |
| 6,635,414 B2 | 10/2003 | Wisniewski | |
| 6,988,370 B2 | 1/2006 | Iarocci et al. | |
| 7,197,884 B2 | 4/2007 | Jones et al. | |
| 7,226,552 B2 | 6/2007 | Manini et al. | |
| 7,275,395 B1 | 10/2007 | Ventura | |
| 7,290,396 B2 | 11/2007 | Rampersad et al. | |
| 7,310,967 B2 | 12/2007 | Aragon | |
| 7,547,416 B2 | 6/2009 | Lihl et al. | |
| 7,634,975 B2 | 12/2009 | Fuhr et al. | |
| 8,037,696 B2 | 10/2011 | Shaham et al. | |
| 8,067,149 B2 | 11/2011 | Livesey et al. | |
| 8,181,813 B2 | 5/2012 | Cognard | |
| 8,372,634 B2 | 2/2013 | Lin et al. | |
| 8,448,454 B2 | 5/2013 | Bowdish et al. | |
| 8,448,457 B2 | 5/2013 | Cutting et al. | |
| 8,453,477 B2 | 6/2013 | Crespo et al. | |
| 8,469,228 B2 | 6/2013 | Adams | |
| 8,739,556 B2 | 6/2014 | Koshimura et al. | |
| 8,770,907 B2 | 7/2014 | Koshimura et al. | |
| 8,794,012 B2 | 8/2014 | Cheng | |
| 8,956,855 B2 | 2/2015 | Cognard et al. | |
| 8,997,615 B2 | 4/2015 | Minemura et al. | |
| 9,227,741 B2 | 1/2016 | Oztas et al. | |
| 9,275,508 B1 | 3/2016 | Lavra et al. | |
| 9,554,572 B2 | 1/2017 | Katkov et al. | |
| 9,664,431 B2 | 5/2017 | Mullen et al. | |
| 9,694,964 B2 | 7/2017 | McCormick | |
| 9,920,970 B2 | 3/2018 | Arnitz et al. | |
| 9,939,422 B2 | 4/2018 | Rice et al. | |
| 9,939,423 B2 | 4/2018 | Rice et al. | |
| 10,001,313 B2 | 6/2018 | Petrov | |
| 2006/0045754 A1 | 3/2006 | Lukens | |
| 2006/0101832 A1 | 5/2006 | Wurzinger et al. | |
| 2006/0162652 A1 | 7/2006 | Lang et al. | |
| 2006/0260328 A1 | 11/2006 | Rampersad | |
| 2006/0260329 A1 | 11/2006 | Rampersad et al. | |
| 2007/0170201 A1 | 7/2007 | Steffens | |
| 2008/0083763 A1 | 4/2008 | Nielsen | |
| 2008/0141700 A1 | 6/2008 | Fuchs | |
| 2009/0202978 A1 | 8/2009 | Shaham | |
| 2010/0281886 A1 | 11/2010 | Shaham et al. | |
| 2010/0299278 A1 | 11/2010 | Kriss et al. | |
| 2011/0073630 A1 | 3/2011 | Saho et al. | |
| 2012/0247999 A1 | 10/2012 | Nishio et al. | |
| 2012/0318808 A1 | 12/2012 | McCormick | |
| 2012/0325826 A1 | 12/2012 | McCormick | |
| 2013/0232998 A1 | 9/2013 | Ward et al. | |
| 2014/0079794 A1 | 3/2014 | Miura | |
| 2015/0017689 A1 | 6/2015 | Darde et al. | |
| 2015/0166350 A1 * | 6/2015 | Fritz | B30B 15/302 100/304 |
| 2015/0176892 A1 * | 6/2015 | Darde | F25J 3/0625 62/602 |
| 2015/0204598 A1 | 7/2015 | Affleck et al. | |
| 2015/0289500 A1 | 10/2015 | Fuhr et al. | |
| 2016/0057992 A1 | 3/2016 | Lou et al. | |
| 2016/0084563 A1 | 3/2016 | Ghiraldi | |
| 2016/0114326 A1 | 4/2016 | Schryver | |
| 2016/0153614 A1 | 6/2016 | Cognard | |
| 2016/0158759 A1 | 6/2016 | Derdau et al. | |
| 2016/0165881 A1 | 6/2016 | Arndt et al. | |
| 2016/0260161 A1 | 9/2016 | Atchley et al. | |
| 2016/0289000 A1 | 10/2016 | Caveney et al. | |
| 2016/0334062 A1 | 11/2016 | Kermaidic et al. | |
| 2017/0146277 A1 * | 5/2017 | Newman | F25D 3/14 |
| 2017/0198959 A1 | 7/2017 | Morris | |
| 2017/0206497 A1 | 7/2017 | Kriss | |
| 2017/0284723 A1 | 10/2017 | Newman | |
| 2018/0010839 A1 | 1/2018 | Zhou et al. | |
| 2018/0055042 A1 | 3/2018 | Sarmentero Ortiz | |
| 2018/0299193 A1 | 10/2018 | Burkot et al. | |

FOREIGN PATENT DOCUMENTS

| | | |
|---|---|---|
| EP | 0854334 A1 | 7/1998 |
| EP | 2336684 B1 | 4/2013 |
| EP | 2604956 A1 | 6/2013 |
| EP | 2873937 A1 | 5/2015 |
| EP | 2881646 A1 | 6/2015 |
| EP | 3032195 A1 | 6/2016 |
| EP | 3173715 A1 | 5/2017 |
| GB | 2030277 A | 4/1980 |
| JP | H02-307819 A | 12/1990 |
| JP | H06-293508 A | 10/1994 |
| JP | 3029950 B2 | 4/2000 |
| JP | 3247675 B | 1/2002 |
| JP | 3295695 B | 6/2002 |
| JP | 2009-196838 A | 9/2009 |
| JP | 3162797 U | 9/2010 |
| JP | 2014-101241 A | 6/2014 |
| WO | 2014006281 A1 | 1/2014 |
| WO | 2015082704 A1 | 6/2015 |

* cited by examiner

Step 1: beginning of the dispensing process

FIG. 9a

Step 2: intermediate step of the dispensing process

FIG. 9b

Step 3: end of the dispensing process

FIG. 9c

METHODS FOR AUTOMATIC FILLING, CHARGING AND DISPENSING CARBON DIOXIDE SNOW BLOCK

CROSS REFERENCE TO RELATED APPLICATION

This application claims the benefit of priority to U.S. provisional application Ser. No. 62/599,949, filed Dec. 18, 2017, the disclosure of which is incorporated by reference herein in its entirety.

FIELD OF INVENTION

This invention relates to methods for automatically generating CO2 snow block within a selected container inside a dispensing station or generating CO2 snow block by auto charging into a container that can be situated within a charging station.

BACKGROUND OF THE INVENTION

Drug development continues to be a major endeavor in the pharmaceutical industry. Drug development requires clinical trials to establish the safety and efficacy of new treatments. Today, in the United States, alone, there are a large number of on-going clinical trials in various stages. Each clinical trial can involve hundreds to thousands of patients who have volunteered to the administering of certain experimental drugs. Generally speaking, as part of the clinical trial, biological samples (e.g., tissue, urine, blood samples) are collected from participants at a clinical site, such as a hospital, university, or physician office, and then transported to laboratories for analysis or to facilities where they may be stored frozen for analysis at a later time.

The ability to evaluate the safety and efficacy of an experimental drug requires obtaining reproducible and reliable results during the clinical trials. The biological samples must be stabilized and preserved during storage and transport between, by way of example, the clinic and the laboratory. A common means to preserve biological samples today is to freeze and store them in the presence of solid carbon dioxide (i.e., dry ice).

Dry ice systems typically involve manually loading the samples and dry ice into an insulated box, such as a polystyrene box, at the clinical site where the samples are acquired. The insulated box is typically provided to the clinical site by a pharmaceutical company or contract research organization administering the clinical trial. The insulated box components may be provided in an assembled or disassembled state. Assembly of the insulated box and loading of the dry ice can be labor intensive. There may also be considerable cost and inconvenience associated with maintaining a sufficient supply of dry ice at the clinical site. Additionally, the failure to use such dry ice within certain duration can cause the dry ice to lose its cooling effect. Further, the insulated box is typically not reusable and must be discarded, thereby creating waste.

Other drawbacks also exist with the transport of samples in conventional insulated boxes. The dry ice cools the interior of the insulated box as it sublimates to carbon dioxide vapor. A number of insulated boxes are available that can maintain a cold interior temperature for various durations up to four or five days. The interior sample space may be uniformly near dry ice temperature upon initial full dry ice loading, but as the dry ice sublimates, significant temperature gradients can arise within the interior sample space, potentially compromising sample quality. The insulated boxes are generally shipped via expedited delivery methods to ensure a sufficiently cold temperature is maintained within the interior sample space. However, should delays or disruptions occur in the shipping lanes, the samples can degrade. As a result of such delays during shipment, additional dry ice may be required to be loaded into the box during transit, which results in increased cost and logistical complexity to the shipment.

One alternative to conventional dry ice shippers is a cryogenic liquid nitrogen-based vapor vessel. Cryogenic liquid nitrogen-based vapor vessels utilize an absorbent to retain the cold nitrogen in the vapor state and avoid the presence of nitrogen in its liquid form. However, such liquid nitrogen-based vapor vessels suffer from drawbacks. One drawback is the time and labor involved in the preparation of the vessel. Specifically, users prepare such vessels by pouring liquid nitrogen into the vessel; waiting several hours to allow for sufficient absorption of the nitrogen onto the absorbent to occur; followed by decanting the excess liquid nitrogen prior to shipment. Substantial handling of the cryogenic liquid nitrogen is necessary, and significant time is required to prepare the liquid nitrogen shipper prior to its usage. Further, the costs associated with the use of liquid nitrogen-based vapor vessels are significantly higher than alternative dry ice vessels.

In view of these drawbacks, there is an unmet need for an improved way for preserving samples into a container during storage and transport.

SUMMARY OF THE INVENTION

In one aspect, a method of automatically filling carbon dioxide (CO2) snow block into a container within an automatic dispensing station, comprising: receiving a first signal corresponding to a pressure of liquid CO2 into a controller as a first set point; inputting into the controller a volume of the CO2 snow block to be generated as a second set point; the controller determining a fill time to generate the volume of the CO2 snow block based on the first set point and the second set point; the controller selecting the container with an interior volume corresponding to the second set point, said container located within the automatic dispensing station, and said automatic dispensing station comprising two or more containers of different interior volumes; flowing a gaseous CO2 into a fill conduit to pressurize the fill conduit at or above a pressure sufficient to prevent a phase change of the liquid CO2; the controller causing a liquid CO2 control valve to allow the liquid CO2 to flow along the fill conduit and into the container when the controller determines the pressure in the fill conduit is at or above the pressure sufficient to prevent the phase change of the liquid CO2; introducing said liquid CO2 into the container; at least a portion of said liquid CO2 undergoing a phase change to transform into said CO2 snow block and offgas CO2 within the container; withdrawing said offgas CO2 from the container through a plate permanently affixed or removably affixed to the container, said plate permeable to the offgas CO2 and at least partially impermeable to a solid phase CO2; measuring an elapsed time of filling the container with the liquid CO2 and generating a second signal corresponding to the elapsed time; transmitting the second signal corresponding to the elapsed time to the controller; the controller (i) allowing said liquid CO2 to continue to flow into the container, in the absence of an override, when the elapsed time is less than the fill time, and (ii) preventing said liquid $CO_2$ to flow in the container when the elapsed time has reached the fill time.

In a second aspect, a method of automatically filling carbon dioxide ($CO_2$) snow block into a container within an automatic dispensing station and vending said $CO_2$ snow block from the selected container, comprising: inputting into a controller a set point to be used for determining completion of fill of $CO_2$ snow block into the container, said set point based on i) fill duration; (ii) a pre-defined weight of the $CO_2$ snow block, (iii) a pressure in the selected container, (iv) a capacitance of the $CO_2$ snow block, (v) a temperature in the container or (vi) a deformation of a plate, said plate permanently affixed or removably affixed to the container; the controller receiving a volume of the $CO_2$ snow block to be generated; the controller selecting the container having an interior volume that is capable of receiving the volume of the $CO_2$ snow block to be generated, said container located within the automatic dispensing station comprising two or more containers of different interior volumes; flowing a sufficient amount of gaseous $CO_2$ into and along a fill conduit; the controller transmitting a first signal to a liquid $CO_2$ control valve to cause the liquid $CO_2$ to flow along the fill conduit and into the container and therein undergo a phase change to transform into $CO_2$ snow block and offgas $CO_2$; withdrawing said offgas $CO_2$ from the selected container through the plate, said plate permeable to the offgas $CO_2$ and at least partially impermeable to a solid phase $CO_2$, and further wherein said fill conduit is operably connected to the container; measuring a real-time variable corresponding to the set point and generating a second signal corresponding to the real-time variable; transmitting the second signal to the controller; the controller (i) allowing said liquid $CO_2$ to continue to flow into the container, in the absence of an override, when determining the real-time variable has not reached the set point; and the controller (ii) preventing said liquid $CO_2$ to flow in the container when the real-time variable has reached the set point, and in response thereto, the controller transmitting a third signal to configure the container into a dispensing orientation, said container in the dispensing orientation containing the volume of the $CO_2$ snow block.

In a third aspect, a method of automatically charging carbon dioxide ($CO_2$) snow block into a container, comprising: inputting into a controller a set point to be used for determining completion of fill of the $CO_2$ snow block into the container, said set point based on i) fill duration; (ii) a pre-defined weight of the $CO_2$ snow block, (iii) a pressure in the container, (iii) a capacitance of the $CO_2$ snow block, (v) a temperature in the container or (vi) a deformation of a plate, said plate permanently affixed or removably affixed to the container; the controller performing integrity checks and determining said integrity checks to meet applicable criteria; and in response thereto, flowing a sufficient amount of gaseous $CO_2$ from a supply manifold into the fill conduit; the controller receiving a first signal corresponding to the pressure in the supply manifold and the fill conduit; the controller transmitting a second signal to a liquid $CO_2$ control valve situated along the supply manifold to configure the liquid $CO_2$ valve into the open position when the controller determines the first signal corresponding to the pressure in the supply manifold and the fill conduit is at or above a pressure sufficient to prevent a phase change of liquid $CO_2$; withdrawing the liquid $CO_2$ from a $CO_2$ source into the supply manifold at a pressure higher than that of the gaseous $CO_2$, thereby stopping flow of the gaseous $CO_2$ through the fill conduit, said $CO_2$ source operably connected upstream of the supply manifold; introducing the liquid $CO_2$ into the container through the fill conduit; the $CO_2$ liquid undergoing a phase change to transform into said $CO_2$ snow block and offgas $CO_2$ within the container; withdrawing said offgas $CO_2$ from the container; measuring a real-time variable corresponding to the set point and generating a third signal corresponding to the real-time variable; transmitting the third signal corresponding to the real-time variable to the controller; wherein said liquid $CO_2$ continues to enter the container, in the absence of an override, until the controller determines the real-time variable to reach the set point.

In a fourth aspect, a method of preparing a container for automated charging carbon dioxide ($CO_2$) snow block into a single container, comprising: inputting into a controller a set point to be used for determining completion of fill of the $CO_2$ snow block into the container, said set point based on i) fill duration; (ii) a pre-defined weight of the $CO_2$ snow block, (iii) a pressure in the container, (iii) a capacitance of the $CO_2$ snow block, (v) a temperature in the container or (vi) a deformation of a plate, said plate permanently or removably affixed to the container; the controller performing integrity checks and determining said integrity checks to meet applicable criteria; and in response thereto, the controller validating the container is in a filling orientation, and if the container is determined to not be in the filling orientation, said controller either (i) transmitting a first signal to cause the container to actuate into the filling orientation, or (ii) transmitting an alert notification for a user to manually configure the container into the filling orientation.

In a fifth aspect, a method of selecting a container within an automatic dispensing station to automatically fill carbon dioxide ($CO_2$) snow block into the container, comprising: inputting into the controller a volume of the $CO_2$ snow block to be generated as a set point; the controller selecting the container with an interior volume corresponding to the set point, said container located within the automatic dispensing station, and said automatic dispensing station comprising two or more containers of different interior volumes; and the controller validating the container is in a filling orientation, and if the container is determined to not be in the filling orientation, said controller either (i) transmitting a signal to cause the container to actuate into the filling orientation, or (ii) transmitting an alert notification for a user to manually configure the container into the filling orientation.

DETAILED DESCRIPTION OF THE INVENTION

As will be described, in one aspect, the present invention offers a method for automatically generating various size CO2 snow blocks available from an automatic dispensing station. A user can readily access the generated CO2 snow block from an inlet and outlet accessing window of a conveyor system located within the dispensing station. The on-demand generation of the present invention eliminates the need for a user to maintain an inventory of CO2 snow block or dry ice on-site.

It should be understood that the term "CO2 snow" and "dry ice" have the same meaning and may be used interchangeably herein and throughout to mean particles of solidified CO2.

"CO2 snow block" or "CO2 block," both of which may be used interchangeably herein and throughout, are intended to mean the creation of CO2 snow particles in a substantially block-like form of any shape consisting of tightly held-particles.

"CO2 fluid" as used herein means any phase including, a liquid phase, gaseous phase, vapor phase, supercritical phase, or any combination thereof.

"CO2 source" or "CO2 liquid source" as used herein includes, but is not limited to, cylinders, dewars, bottles, and bulk or microbulk tanks.

"Conduit" or "conduit flow network" as used herein means tube, pipe, hose, manifold and any other suitable structure that is sufficient to create one or more flow paths and/or allow the passage of a fluid.

"Connected" or "operably connected" as used herein means a direct or indirect connection between two or more components, such as piping and assembly, including, but not limited to instrumentation, valves and conduit, unless specified otherwise, so as to enable fluid, mechanical, chemical and/or electrical communication between the two or more components.

"Item" as used herein means any temperature-sensitive goods, products or supplies which may be susceptible to spoilage, degradation, and/or structural alteration or modification if not maintained frozen or below a certain temperature, including, but not limited to, biological samples, such as blood, urine and tissue samples or their constituents; perishable foods, such as meat, poultry, fish and dairy products; personal care items; and chemicals.

"Charging" as used herein means the process of introducing CO2 fluid from an external CO2 source into a container operably connected to the external CO2 source.

"Container" as used herein means any storage, filling, delivery or transportable vessel capable of receiving CO2 fluid, including but not limited to, mold cavities, cylinders, dewars, bottles, tanks, barrels, bulk and microbulk.

"Transportable" means an apparatus that is capable of being moved, transported or shipped from a user location to another destination by any known means, including, but not limited to, air, ground or water. The transport or shipping can occur through various packaged delivery services, including, but not limited to, parcel post, UPS® shipping services, FedEx® shipping services and the like.

The embodiments as described below are by way of example only, and the invention is not limited to the embodiments illustrated in the drawings. It should also be understood that the drawings are not to scale and in certain instances details have been omitted, which are not necessary for an understanding of the embodiments, such as conventional details of fabrication and assembly. It should also be understood that the exact conduit and valving configuration are not drawn to scale, and certain features are intentionally omitted in each of the drawings to better illustrate various aspects of the automated filling and auto charging processes in accordance with the principles of the present invention.

The embodiments are described with reference to the drawings in which similar elements are referred to by like numerals. The relationship and functioning of the various elements of the embodiments are better understood by the following detailed description. The detailed description contemplates the features, aspects and embodiments in various permutations and combinations, as being within the scope of the disclosure. The disclosure may therefore be specified as comprising, consisting or consisting essentially of, any of such combinations and permutations of these specific features, aspects, and embodiments, or a selected one or ones thereof.

Figure 1A:
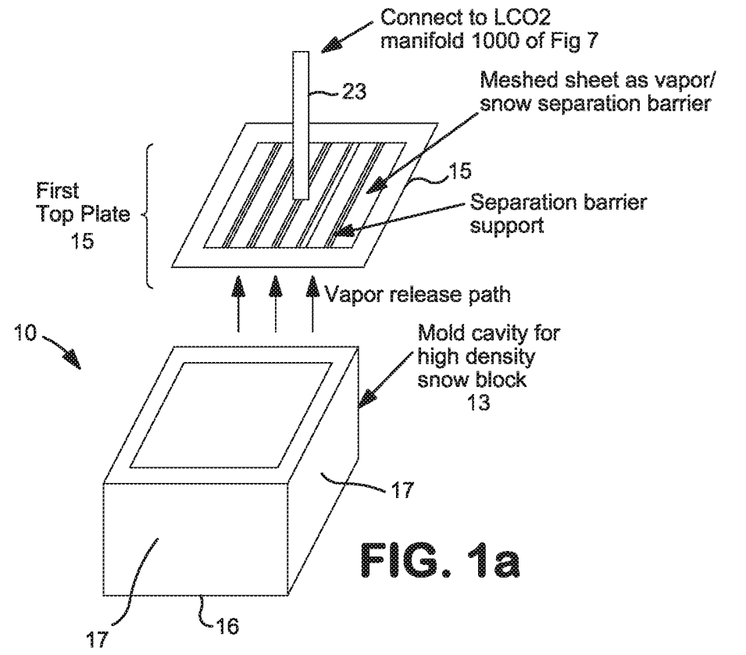
FIG. 1a illustrates a representative perspective view of a container and top plate with fill conduit attached to the top plate to make carbon dioxide ($CO_2$) snow block within an automatic fill dispensing station in accordance with the principles of the present invention.
Figure 1B:
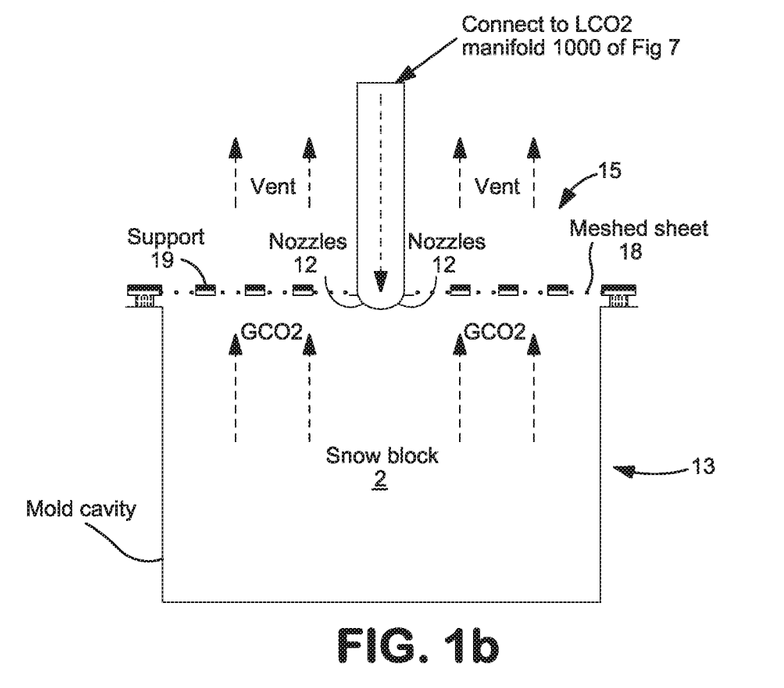
FIG. 1b illustrates a cross-sectional view of FIG. 1a, which shows in detail the gas flow of $CO_2$ through the meshed sheet of the top plate.

In one aspect of the present invention, a method of automatically filling carbon dioxide (CO2) snow block into a selected container within an automatic dispensing station will be discussed with reference to FIGS. 1a, 1b, 2a, 2b, 3, 4, 5, 7, 9a, 9b and 9c. FIGS. 1a and 1b illustrate a first container 10 that is used with the automatic dispensing station 1 (FIGS. 2, 3, 4 and 5) to vend CO2 snow block 2 from the first container 10 into any suitable user box. The first container 10 includes a mold cavity 13 with a first top plate 15. The mold cavity 13 has a volume that is sized to receive the volume of CO2 snow block 2. The desired volume of the CO2 snow block 2 is inputted into a programmable logic controller (PLC) 1085 of the automatic dispensing station 1. The PLC 1085 selects the mold cavity 13, which is located within the automatic dispensing station 1, only when it determines that mold cavity 13 has a volume equal to or larger than the inputted volume of $CO_2$ snow block 2 into the PLC 1085. The PLC 1085 orients the selected mold cavity 13 into a filling orientation (FIG. 2*b*) and performs an automated filling process to fill the requisite amount of $CO_2$ snow block 2 into the mold cavity 13. The filling process is preferably based on filling time to achieve the desired volume of the $CO_2$ snow block 2.

Upon completion of the fill, the $CO_2$ snow block 2 is transferred from the mold cavity 13 into a user box 22 (FIG. 4) that is vended to a user for pick-up. Specifically, the user box 22 is fed at an inlet window 21 and subsequently conveyed along a conveyor belt 20 to a dispensing window 14 of the automatic dispensing station 1 for a user to access and pick-up.

The structural details of the first container 10 are shown in FIGS. 1*a* and 1*b*. The mold cavity 13 generally includes a top plate 15, a bottom wall 16, and multiple vertically oriented side walls 17. Top plate 15 is characterized by a separation barrier support that is permeable only to gaseous $CO_2$ and substantially impermeable to $CO_2$ snow so that gaseous $CO_2$ can escape the interior of mold cavity 13 without significant loss of $CO_2$ snow. Referring to FIG. 1*b*, the separation barrier support includes a support structure 19 and meshed sheet 18. It should be understood that any type of material may be utilized to define passageways for escape of gaseous $CO_2$.

A fill conduit 23 has one end connected to the top plate 15 and another end connected to a $CO_2$ supply manifold 1000. In a preferred embodiment, a total of four nozzles 12 are distributed evenly at the one end of the fill conduit 23. Each nozzle 12 is spaced apart from the other by approximately 90°, and each nozzle 12 has the same sized opening and shape. The structure of the nozzles 12 creates a substantially uniform flow of $CO_2$ fluid therethrough, which allows for the creation of substantially uniform formation and distribution of $CO_2$ snow block 2 within the mold cavity 13. The nozzles 12 are oriented away from a vertical of the fill conduit 23 at an angle ranging from approximately 30° to 60° relative to the vertical of the fill conduit 23, whereby the vertical extends perpendicular to a horizontal surface of the mold cavity 13. It should be understood that other nozzle designs and orientations are contemplated without departing from the scope of the present invention.

Figure 2A:
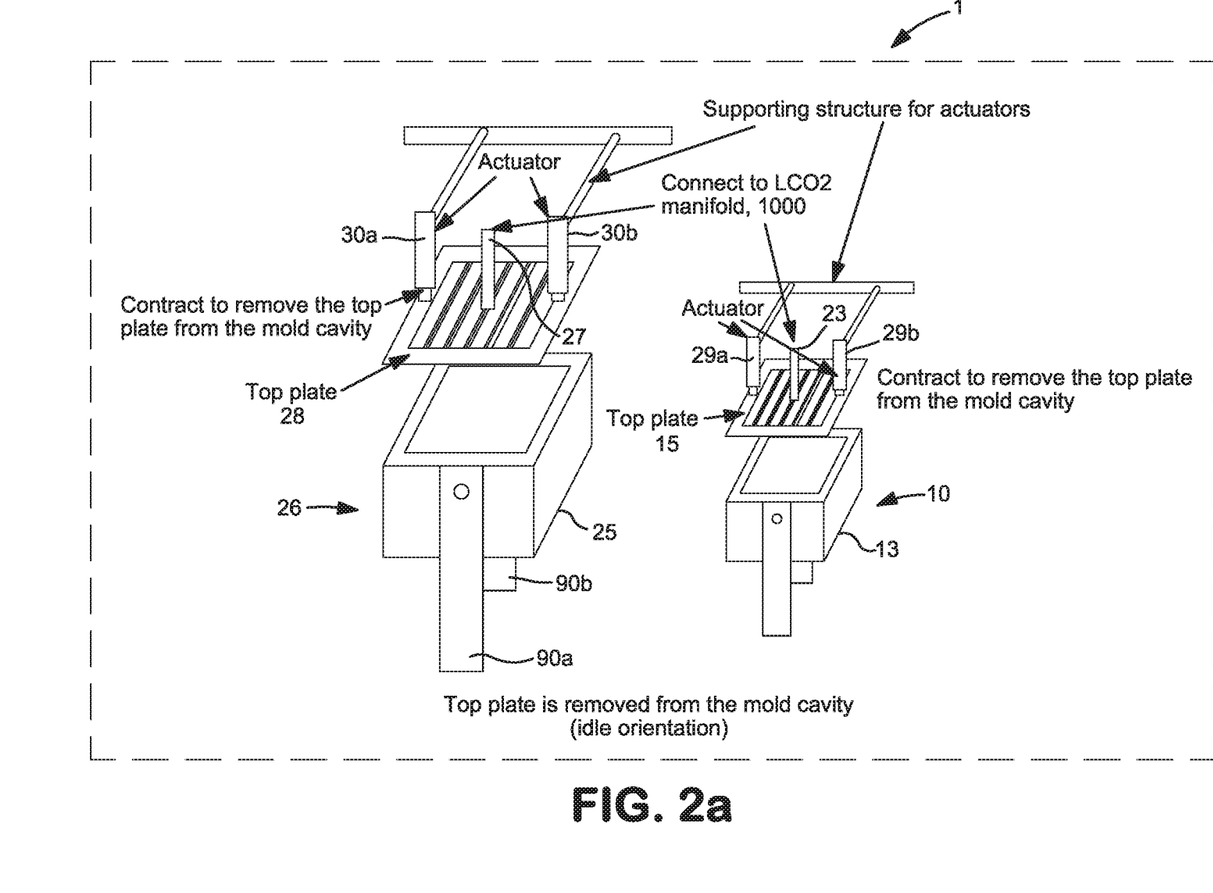
FIG. 2a shows aspects of an automatic dispensing station for generating $CO_2$ snow block within containers of two different sizes, in which each of the containers is shown in a respective idle orientation, in accordance with the principles of the present invention.
Figure 7:
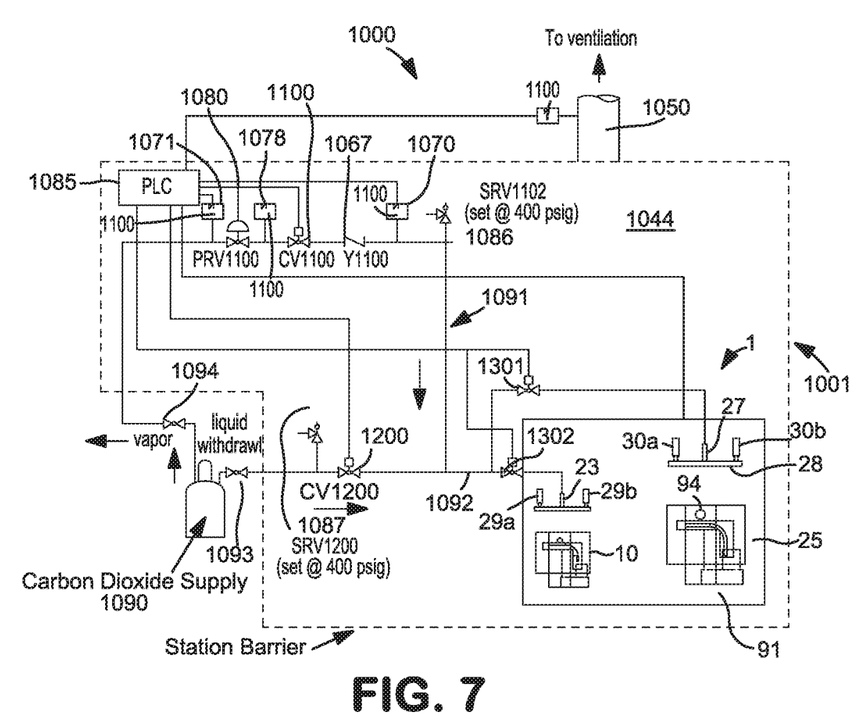
FIG. 7 shows a process flow schematic for introducing CO2 liquid from a CO2 supply manifold that can be utilized into an automatic dispensing station containing multiple containers.

FIG. 2*a* shows the automatic dispensing station 1 that is designed to contain multiple containers. The dotted line is representative of a structural enclosure of the automatic dispensing station 1 within which multiple containers of different volumes can be contained. Specifically, and for purposes of simplicity to better explain the principles of the present invention, only two containers are shown, namely the first container 10 of FIG. 1*a* and a second container 26. The first container 10 has a smaller volume than the second container 26. The automatic dispensing station 1 is detachably connected to the $CO_2$ supply manifold 1000, the details of which are shown in FIG. 7. The first container 10 is shown in an idle orientation in which the first container 10 has first top plate 15 removed from top of the first mold cavity 13. Similarly, the second container 26 is shown in an idle orientation in which the second container 26 has second top plate 28 removed from top of the second mold cavity 25. Neither the first container 10 nor the second container 26 in the idle orientation contains $CO_2$ snow block 2. Vertical actuators 29*a* and 29*b* are attached to the first top plate 15 and are configured to contract to lift first top plate 15 away from the first container 10 to create the idle orientation. Vertical actuators 29*a* and 29*b* are configured to extend and cause first top plate 15 to be lowered onto the first container 10 to create the filling orientation of FIG. 2*b*. Similarly, vertical actuators 30*a* and 30*b* are attached to the second top plate 28 and are configured to lift second top plate 28 away from second container 26 to create the idle orientation, and can be re-configured to extend and cause the second top plate 28 to lower onto the second container 26 to create the filling orientation of FIG. 2*b*.

The PLC 1085 is in electrical communication with the supply manifold 1000 and the various components of the automatic dispensing station 1 and as a result can regulate the various actuators, valving, including automatic control valves and pressure regulating devices, pressure transducers and ventilation system as shown in FIG. 7. Dotted lines in FIG. 7 extending between the PLC 1085 and the various components represent electrical communication. It should be further understood that the PLC 1085 communicates between the PLC 1085 and the various components, including the first container 10, the second container 26 and the various actuators 29*a*, 29*b*, 30*a*, 30*b* responsible for lifting and lowering the top plate and the other actuator assemblies 91*a*, 91*b* responsible for rotating the mold cavities into a dispensing orientation (as will be explained with reference to FIGS. 9*a*, 9*b* and 9*c*).

Figure 2B:
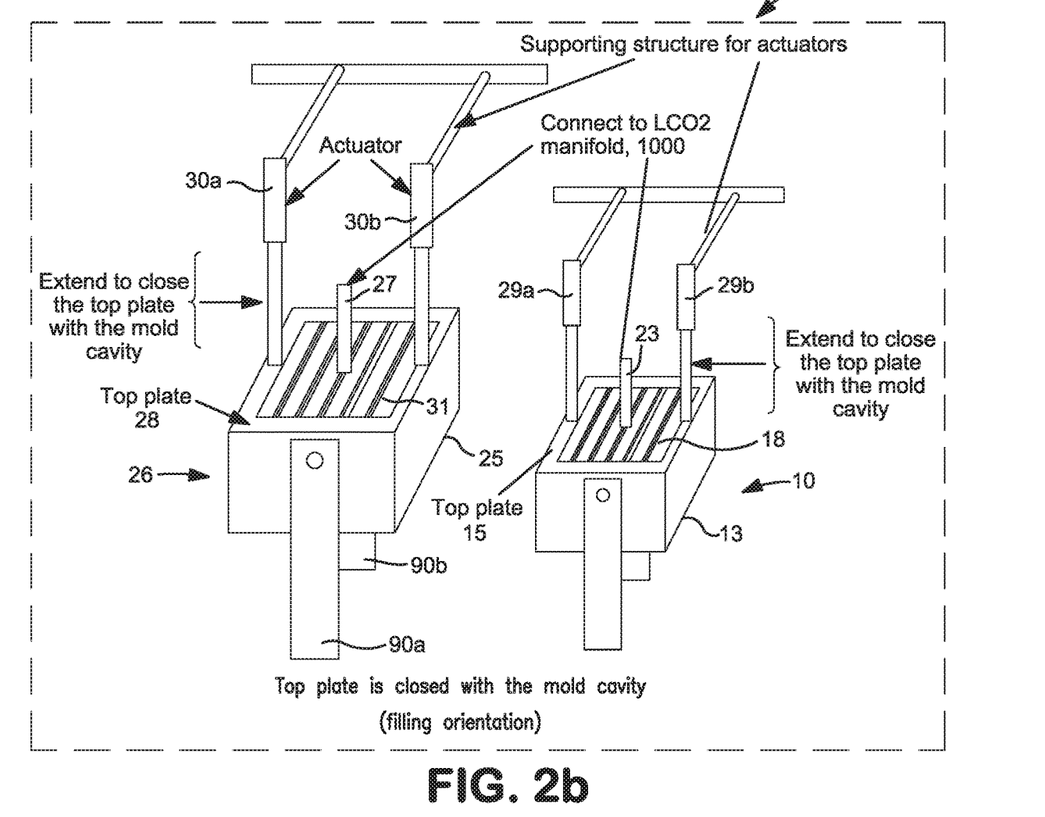
FIG. 2b shows aspects of the automatic dispensing station of FIG. 2a, in which each of the two containers is shown in a respective filling orientation, in accordance with the principles of the present invention.

FIG. 2*b* shows the first container 10 and the second container 26 in a filling orientation in which the respective top plates 15 and 28 are lowered onto their respective mold cavities 13 and 25 with sufficient pressure to form a seal along the periphery of their respective containers 10 and 26. The peripheral seal ensures that the gaseous $CO_2$ within the mold cavities 13/25 can only escape through the meshed sheet 18 and 31 of first container 10 and second container 26, respectively. Specifically, vertical actuators 29*a* and 29*b* are extended relative to FIG. 2*a* to cause first top plate 15 to lower onto first mold cavity 13 with sufficient pressure to form a seal along the periphery of the first mold cavity 13. Vertical actuators 30*a* and 30*b* are extended relative to FIG. 2*a* to cause second top plate 28 to lower onto second mold cavity 25 with sufficient pressure to form a seal along the periphery of the second mold cavity 25. FIG. 2*b* shows that first fill conduit 23 and second fill conduit 27 are detachably connected to the $CO_2$ supply manifold 1000 along which $CO_2$ liquid can flow from a $CO_2$ source 1090, which can comprise any suitable container, including but not limited to, cylinders, dewars, bottles, microbulk or bulk tanks.

The automation process in connection with the automatic dispensing station 1 will now be described. In a preferred embodiment, the PLC 1085 is utilized to control the filling and vending of $CO_2$ snow block 2 by the control methodology 5000 of FIG. 5. The PLC 1085 can be situated in close proximity to the automatic dispensing station 1. In this example, and for purposes of simplicity to better explain the principles of the present invention, the automatic dispensing station 1 contains a first container 10 and a second container 25. However, it should be understood that the automatic dispensing station 1 is preferably designed to accommodate a greater number of containers of different volumes. In one example, the PLC 1085 is located as part of the $CO_2$ supply manifold 1000 shown in FIG. 7. The PLC 1085 is preferably pre-programmed with a density of the $CO_2$ snow block 2 to be produced. The PLC 1085 may use any density, but preferably uses 50-65 lb/ft3 and more preferably 55-60 lb/ft3. At step 501, the PLC 1085 may be activated. Next, a user inputs into the PLC 1085 a desired volume of the $CO_2$ snow block 2 to be generated (step 502). The user may also select on a human machine interface (HMI) the size and/or shape of the specific CO2 snow block or container 10/26. The PLC 1085, in response to the inputted volume, selects and activates a suitable container within the automatic dispensing station 1 that has a volume capable of generating the inputted volume of CO2 snow block 2. The PLC 1085 determines that the volume of the mold cavity 13 corresponding to the first container 10 is smaller than the inputted volume. The PLC 1085 further determines that the volume of the mold cavity 25 corresponding to the second container 26 is equal to or larger than the inputted volume of the CO2 snow block 2. As a result, the PLC 1085 selects the second container 26 to be used for the filling of CO2, and accordingly transmits a signal to the second container 26.

A box 22 (e.g., cardboard box) is fed to an inlet window 21 of conveyor system 4, which is located within the automatic dispensing station 1 (step 503). The box 22 may be fed manually by a user or automatically. The box 22 has a volume that is sized to receive the inputted volume of CO2 snow block 2 to be generated within a mold cavity.

Having selected the proper container for filling of CO2 therein; and with the box 22 having been placed along the inlet 21 of the conveyor belt 20 (step 503), the PLC 1085 is ready to perform pre-fill integrity checks (step 504). Numerous criteria must pass before the filling operation can begin. The PLC 1085 verifies that the ventilation system 1050 (FIG. 7) is turned on through pressure switch "PS1000", shown in communication between the exhaust 1050 and PLC 1085. Specifically, the PLC 1085 verifies that the exhaust system has been turned on and is functioning to enable CO2 gas, and CO2 off gas to vent from mold cavity 25 through exhaust conduit 1050 and then to the exhaust system. The PLC 1085 also determines whether the pressure in the supply manifold 1000 and second fill conduit 27 can be maintained without leakage. If any of these pre-fill integrity criteria are not met, the PLC 1085 aborts the operation and sends a message and status to a human machine interface (HMI) for a user to take appropriate corrective action until all of the pre-fill integrity checks pass (step 505).

If each of the pre-fill integrity checks has been satisfied, then the PLC 1085 selects a suitable mold cavity and activates the selected suitable mold cavity from an idle orientation into the filling orientation (step 506). The PLC 1085, in response to the inputted volume of CO2 snow block, selects a suitable container within the automatic dispensing station 1 that has a volume capable of generating the inputted volume of CO2 snow block 2. The PLC 1085 determines that the volume of the mold cavity 13 corresponding to the first container 10 is smaller than the inputted volume. The PLC 1085 further determines that the volume of the mold cavity 25 corresponding to the second container 26 is equal to or larger than the inputted volume of the CO2 snow block 2. As a result, the PLC 1085 selects the second container 26 to be used for the filling of CO2, and accordingly transmits a signal to the second container 26 to activate the second container 26 from the idle orientation (FIG. 2a) into the filling orientation (FIG. 2b) in connection with step 506. Selected second mold cavity 25 in FIG. 2a is shown in the idle orientation with second top plate 28 spaced apart from top of second mold cavity 25. At this juncture, no CO2 snow block 2 is contained within second mold cavity 25. The PLC 1085 transmits signals to vertical actuators 30a and 30b to cause the vertical actuators 30a and 30b to extend downwards in a longitudinal direction as shown in FIG. 2b, thereby causing the second top plate 28 to move downwards towards the top of second container 26. The vertical actuators 30a and 30b continue to move downwards until evenly positioned onto the top of second mold cavity 25 as shown in FIG. 2b. FIG. 2b shows that the second plate 28 has been lowered onto the top of second container 26 with sufficient pressure to form a seal along the periphery of the second containers 26.

The PLC 1085 validates that the selected container 26 is in the filling orientation, and if not, the PLC 1085 will relay appropriate signals to orient the selected container 26 into the filling orientation. Upon verification that the second container 26 is activated into the filling orientation as shown in FIG. 2b, the PLC 1085 can determine the predetermined or expected fill time of CO2 snow block 2 into the selected container 26 (step 507) as follows. The PLC 1085 receives a signal from pressure transducer 1071 (FIG. 7), which measures the pressure of the CO2 in the vapor headspace of source 1090. Pressure transducer 1071 relays a signal corresponding to the pressure of the CO2 to the PLC 1085. Based on this pressure reading and the aggregate volume of the nozzles 12 in the second fill conduit 27 (a representative schematic of which is shown at FIG. 1b), the PLC 1085 can determine the expected mass flow rate of the CO2 liquid-containing stream, which is empirically determined by a look-up table of pressure versus aggregate volume of the nozzles 12. Having determined mass flow rate, the expected fill time (i.e., predetermined fill time) into the selected second container 26 is calculated by the PLC 1085 as the product of inputted volume of desired CO2 snow block and pre-programmed density of the CO2 snow block to be generated (e.g., preferably 55-60 lb/ft3) divided by the empirically determined mass flow rate.

With the PLC 1085 calculating the predetermined fill time, the PLC 1085 prompts a user message to activate a start button (step 508) to initiate pressurization of the supply manifold 1000 before the filling process. The valving, instrumentation and components of FIG. 7 associated with second fill conduit 27 are configured to be connected with CO2 source supply manifold 1000 and receive CO2 gas and CO2 liquid as will now be explained. Gas conduit 1091 contains pressure transducers 1071 and 1070, and pressure indicator 1078. Pressure transducer 1071 measures the pressure of the headspace in the CO2 source 1090; pressure indicator 1078 measures the pressure of the CO2 gas stream after reduced by pressure reducing valve 1080 ("PRV 1100"); and pressure transducer 1070 measures the pressure of the CO2-liquid containing stream entering the selected second container 26. With CO2 vapor valve 1094 configured in the open position, CO2 control valve 1100 configured in the open position, CO2 liquid withdrawal valve 1093 configured in the closed position, and CO2 control valve 1200 configured in the closed position, CO2 gas is withdrawn from the vapor headspace of CO2 source 1090 and flows into gas conduit 1091. Pressure regulator 1080 ("PRV 1100") reduces the pressure of CO2 gas withdrawn from the CO2 source 1090 from source pressure (e.g., 350-400 psig) to about 150 psig, as measured by pressure indicator 1078. The CO2 gas is preferably added in an amount to prevent the pressure of the liquid-containing CO2 from reducing below a certain pressure (e.g., about 150 psig) to ensure that the liquid does not fall to a pressure that prematurely undergoes a phase change to solid and/or gas within an portion of the conduit of the supply manifold 1000 and second fill conduit 27.

In addition to adequately pressurizing the conduit of manifold 1000, the CO2 gas can optionally be added to flow and purge any residuals and/or impurities for any amount of time. In one example, the purging process can continue for approximately 30 seconds to about 2 minutes. As the CO2 gas flows through the various portions of the gas conduit 1091, any residuals and/or impurities may also be purged. The CO2 gas may be directed into the selected second container 26 by setting valve 1301 open and setting valve 1302 closed. The container 26 at this stage of the filling process does not contain any substantial amount of CO2 snow particulates or CO2 snow block 2. The CO2 gas flows in a downward direction through fill conduit 27 and enters mold cavity 25. The CO2 gas subsequently escapes from container 26 through meshed sheet 31 of second top plate 28 (e.g., withdrawn in a substantially vertically oriented direction as shown in greater detail in FIG. 1b by upward arrows).

When the PLC 1085 determines the pressure in the selected fill conduit 27 and the CO2 supply manifold 1000 is at or above a pressure sufficient to prevent phase change of the liquid CO2 (e.g., preferably, equal to or higher than 150 psig and more preferably from 200 psig up to about 350 psig), the filling of CO2 snow block 2 into selected container 26 begins (step 509). CO2 vapor valve 1094 can remain in the open position; and control valve 1100 can remain in the open position thereby ensuring adequate gas pressurization within manifold 1000 is present prior to and during liquid CO2 filling into container 26. To begin flow of liquid CO2 from CO2 source 1090, control valve 1302 is set in the closed position to ensure that liquid-containing CO2 does not flow into the first container 10 (i.e., the unselected container as determined by PLC 1085); and control valve 1301 is set in the open position to allow liquid-containing CO2 to flow into the second container 26 (i.e., the selected container as determined by PLC 1085). Referring to FIG. 7, the liquid-containing CO2 from CO2 source 1090 flows along liquid conduit 1092 through control valve 1301 and then is introduced in a downwards direction into second fill conduit 27 of the selected second container 26 (as shown in FIG. 1b). Check valve 1067 prevents the pressure of the liquid-containing CO2 from causing the CO2 gas within conduit 1091 to backflow into the CO2 source 1090.

The CO2-containing liquid emerges from the nozzles 12 of second fill conduit 27 to enter selected mold cavity 25 of selected second container 26. In a preferred embodiment, the end of the second fill conduit 27 has four nozzles 12, which are angled to direct or inject the CO2-containing liquid into the selected mold cavity 25 as shown in FIG. 1b. A pressure and temperature drop occurs as the liquid-containing CO2 passes through the nozzles 12 and into the selected mold cavity 25 to produce solid particles of CO2 snow and CO2 off-gas therewithin. The CO2 off-gas passes through the meshed sheet 18 of second top plate 28 while the solid particulates are too large to flow across meshed sheet 18 and therefore remain entrapped within mold cavity 25. The particles and gas do not escape along the top edge of container 26, as the periphery of second container 26 is sealed as a result of actuators 30a and 30b maintaining second top plate 28 sufficiently pressed against the top of mold cavity 25 during the filling. As the CO2 off-gas passes through the meshed sheet 31 as vented gas, it has the desirable effect of packing the solid particles of CO2 snow to form CO2 snow block 2 within the mold cavity 25, thereby beginning the generation of the CO2 snow block 2. The term "packing" as used herein with reference to the automated filling refers to compression of the snow particles into a CO2 snow block 2 of suitable density. The packing can affect the amount of CO2 snow block 2 that can be generated within selected mold cavity 25. In this manner, the present invention has the ability to utilize the formation of the vented gas to improve packing density of the snow particles to form the CO2 snow block 2. The vented CO2 gas flows across the openings of the meshed sheet 31 of second top plate 28, as shown by the arrows in FIG. 1b, thereby preventing excess pressure from accumulating within the second mold cavity 25. It should be understood that the gas can be withdrawn at any angle relative to a vertical of the second fill conduit 27, whereby the vertical extends perpendicular to a horizontal surface of the selected mold cavity 25. The vented gas can then be directed into the exhaust conduit 1050 that is operably connected to the second fill conduit 27.

The particles of CO2 snow continue to form within the selected mold cavity 25 in a block-like form. A timer can continue to monitor an elapsed time and generate a corresponding signal for the elapsed time that is transmitted to the PLC 1085. The PLC 1085 continues to allow the CO2-containing liquid to flow along conduit 1092 as long as the elapsed time is less than the predetermined fill time (step 510).

When the PLC 1085 has determined that the elapsed time has reached the predetermined fill time, filling stops. Specifically, PLC 1085 transmits a signal to control valve 1301 to configure it into the closed position, thereby preventing CO2-containing liquid from continuing to flow into selected container 26. Main liquid withdrawal valve 1093 is also closed. The fill process stops (step 511) in this manner. In response to stopping flow of liquid CO2, gaseous CO2 can resume to flow along gas conduit 1091 and into fill conduit 807 and into container, if desired, for a certain duration as a means for purging any impurities or residuals within conduit of manifold 1000 and/or selected container 26. As the CO2 gas flows into the selected container 26 and then vents, the snow block 2 may become more packed.

Shut down of manifold 1000 can also occur as part of step 511. Residual liquid CO2 may be entrapped along the portion of liquid conduit 1092 extending from the control valve 1200 to the main liquid withdrawal valve 1093. Safety relief valves 1086 and 1087 ("SRV 1102" and "SRV 1200") are designed to relieve residual pressure that may be entrapped within gas conduit 1091 and/or liquid conduit 1092. As the trapped liquid CO2 therealong can eventually sublime into CO2 gas, the pressure buildup can be relieved by the safety relief valve 1087, which in one example is set to actuate at 400 psig. The safety relief valve 1086 also serves to relieve pressure if and when the pressure buildup in the CO2 gas 1091 conduit reaches an upper limit (e.g., 400 psig).

Figure 3:
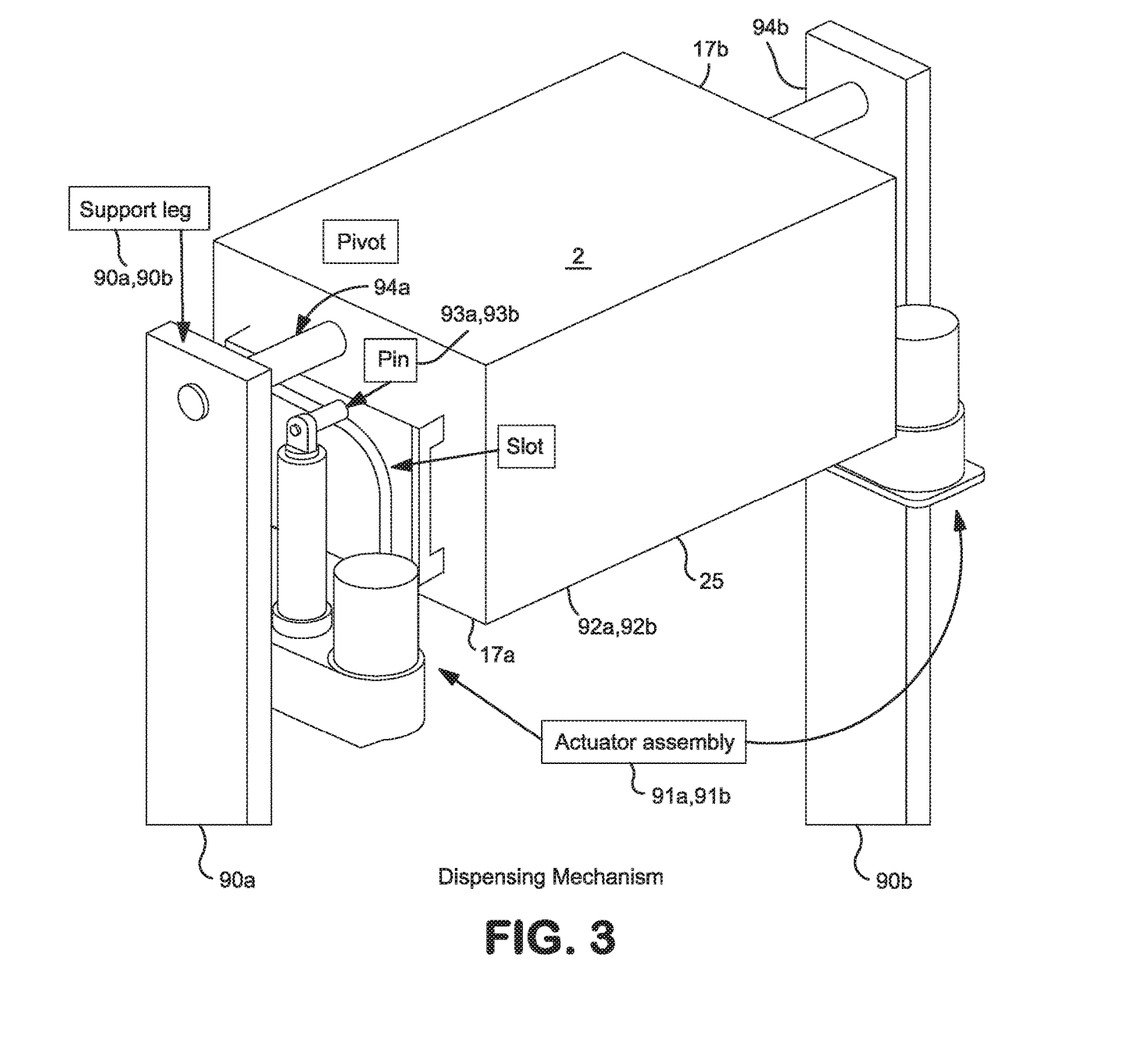
FIG. 3 shows an exemplary actuating mechanism used for dispensing CO2 snow block from one of the containers previously selected for filling and which is located in the automatic dispensing station.
Figure 4:
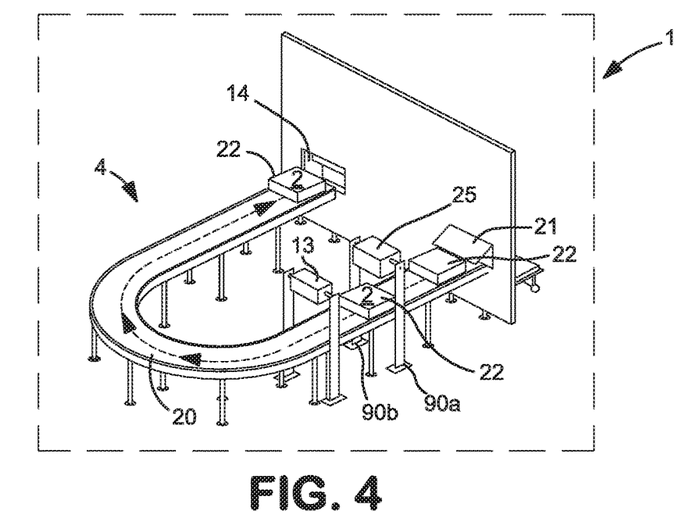
FIG. 4 shows aspects of a conveyor system located within the automatic dispensing station, whereby a box can be fed into the inlet of the conveyor system that is transported below the selected container filled with CO2 snow block and which is tilted into the dispensing orientation to transfer CO2 snow block from the container into the box as part of an auto vending system.
Figure 5:
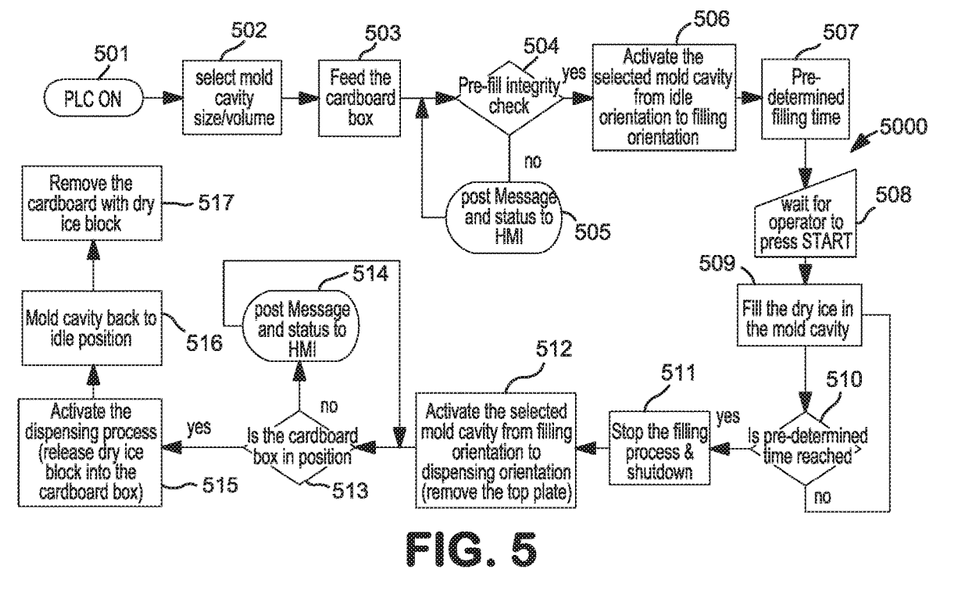
FIG. 5 shows a control methodology utilized to perform the automatic dispensing station in accordance with the principles of the present invention.
Figure 9A:
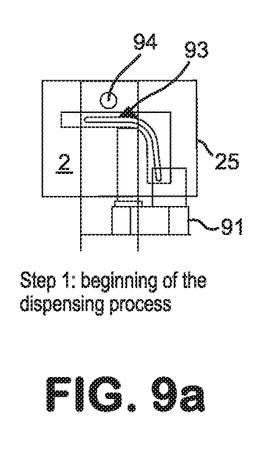
FIG. 9a shows a starting orientation of the selected container ready to dispense CO2 snow block from inside of the container.

Having ended the fill process, the PLC 1085 activates the selected mold cavity 25 from the filling orientation into a dispensing orientation (step 512). First, actuators 30a and 30b are contracted to cause the top plate 28 to be lifted away from the top of mold cavity 25 in a similar manner as show in FIG. 2a. FIG. 3 shows an enlarge view of selected mold cavity 25 containing the desired volume of CO2 snow block 2 with the top plate 28 removed. The mold cavity 25 is ready to dispense CO2 snow block 2 into a box 22, which is conveyed along conveyor belt 20 to a position located below the mold cavity 25 so that it can receive the CO2 snow block 2 as it drops from inside mold cavity 25 into box 22. FIG. 4 shows the movement of box 22 along conveyor belt 20. Specifically, FIG. 4 shows the conveyor system 4 with box 22 moving from the inlet 21 of conveyor window, to a position beneath the mold cavity 25 where it receives the CO2 block 2; and finally to a dispensing window of conveyor system 4 ready for pick-up with the desired CO2 block 2 loaded inside box. When the box 22 is determined to be in the desired position (step 513), the mold cavity 25 is tilted to cause CO2 snow block 2 therein to dispense into the box 22, as will now be described in the sequence of FIGS. 9a, 9b and 9c. FIG. 3 and FIG. 9a show the mold cavity 25 at the start of the dispensing process. FIG. 3 shows that actuator assembly 91a and actuator assembly 91b are operably connected to a first side 17a and second side 17b of selected mold cavity 25, respectively. As used herein, and referring to FIG. 3, a part number followed by "a" is intended to refer to the first side of mold cavity 25 and the same part number followed by "b" is intended to refer to the second side 17b of the mold cavity 25; and the same part number not followed by "a" or "b" is intended to generally refer to the structure associated with mold cavity 25 when mold cavity 25 is not shown in a perspective view (e.g., with reference to FIGS. 9a, 9b and 9c). By way of example, actuator assembly 91a refers to the actuator assembly operably connected to the first side 17a of mold cavity 25 as shown in FIG. 9a; actuator assembly 91b refers to the actuator assembly operably connected to the second side 17b of mold cavity 25; and actuator assembly 91 generally refers to the actuator assembly of mold cavity 25 as shown in cross-sectional views of FIGS. 9a, 9b and 9c. Each of the actuator assemblies 91a and 91b remain engaged to the first side 17a and second side 17b of selected mold cavity 25 through respective pins 93a, 93b which are engaged into respective slots 92a and 92b. The actuator assemblies 91a and 91b cause the mold cavity 25 to rotate when pin 93a, 93b slides along corresponding slots 92a, 92b (as will be explained below). The mold cavity 25 is able to pivot about pivot point 94a and 94b which is connected to support leg structures 90a and 90b. Supporting leg structures 90a and 90b suspend the mold cavity 25 as shown in FIGS. 2a, 2b, 3 and 4. It should be understood that the details of the actuator assemblies as shown in FIG. 3 are omitted from the conveyor system of FIG. 4 and the other figures showing the automatic dispensing station 1 for purposes of clearly describing salient aspects of the present invention in connection with those figures.

Figure 9B:
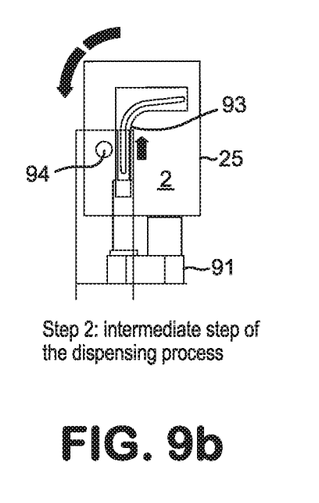
FIG. 9b shows an intermediate orientation created as a result of the selected container rotated 90° counterclockwise relative to the position of FIG. 9a as a result of the actuator assembly exerting an upward force along the sides of the container.
Figure 9C:
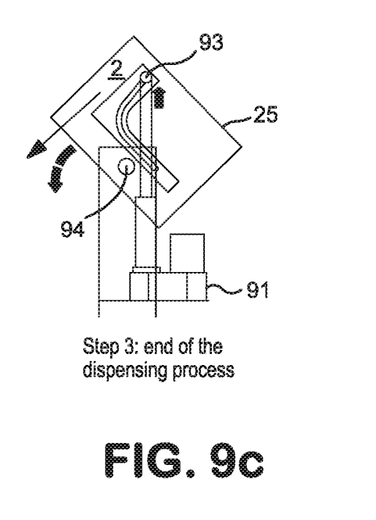
FIG. 9c shows a final titled orientation of the selected container rotated an additional 45° counterclockwise relative to the position of FIG. 9b in which the CO2 snow block can be released from inside of container into a box located beneath the selected container.

Starting from the orientation of FIG. 3 and FIG. 9a, the actuator assembly 91a and actuator assembly 91b are each activated (e.g., programmed by PLC 1085) to exert an upward force which is transmitted to each of pins 93a, 93b on first side 17a and second 17b of mold cavity 25, respectively. The pins 93a, 93b are restricted from moving upwards within slots 92a, 92b. As a result, the pins 93a, 93b, each of which is spaced the same distance away from the pivot 94a, 94b, exert a torque that causes mold cavity 25 to rotate counterclockwise. As the mold cavity 25 rotates counterclockwise, the slots 92a, 92b become vertically oriented thereby allowing the respective arms of the actuator assemblies 91a, 91b to extend upwards along slots 92a, 92b. FIG. 9b shows an intermediate configuration of the rotated mold cavity 25 having rotated 90 degrees counterclockwise about pivot 94a, 94b in which arms of actuator assemblies 91a, 91b have partially expanded upwards into and along slots 92a, 92b. The arms of the actuator assemblies 91a, 91b continue to exert an upward force through their respective pins 93a, 93b to create additional counterclockwise rotation of mold cavity 25 until the arms and respective pins 93a, 93b have travelled to the upper most edge of slots 92a, 92b as shown in FIG. 9c. FIG. 9c represents an additional 45° counterclockwise rotation relative to FIG. 9b. The tilted orientation of FIG. 9c can allow the CO2 snow block 2 to be released from inside of mold cavity 25 into box 22 (step 515), which at this juncture is positioned below mold cavity 25 as shown in FIG. 4. FIG. 4 shows mold cavity 25 inverted to indicate that CO2 snow block 2 has been released into box 22. The designation "2" within box 22 is intended to signify that the box 22 contains CO2 snow block 2.

With CO2 snow block 2 released from mold cavity 25 and dispensed into box 22, the actuator arms are retracted, causing the pins 93a, 93b and arms attached thereto to travel downwards along slots 92a, 92b to be reconfigured into the orientation of FIG. 9a, which at this stage, represents the idle orientation of mold cavity 25 (step 516). Box 22 with CO2 snow block 2 therein is conveyed along conveyor belt 20 to the outlet/dispensing window 14 of conveyor system 4 ready for pick-up (step 517).

While the automated filling into an automatic dispensing station 1 has been performed based on a predetermined fill time, the automated fill can also occur based on other criteria. For example, the PLC 1085 can use another set point for filling, including, by way of example, a pre-defined weight of the CO2 snow block 2; a pressure in the selected mold cavity; a capacitance of the CO2 snow block 2; a temperature in the container; or a deformation of a top plate of the selected mold cavity.

Figure 6:
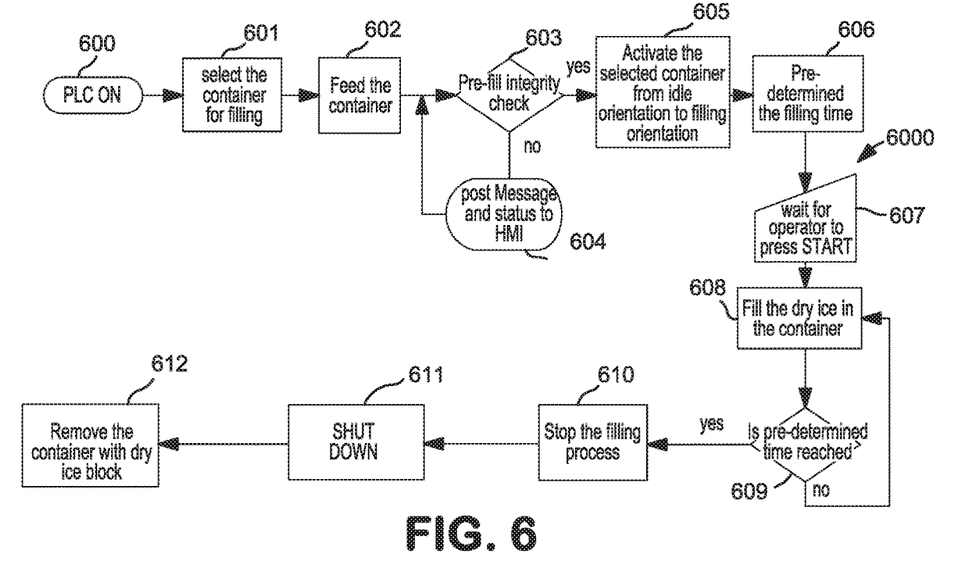
FIG. 6 shows a control methodology utilized to perform an automatic charging operation into a single container that is loaded within a charging station of FIG. 8.
Figure 8:
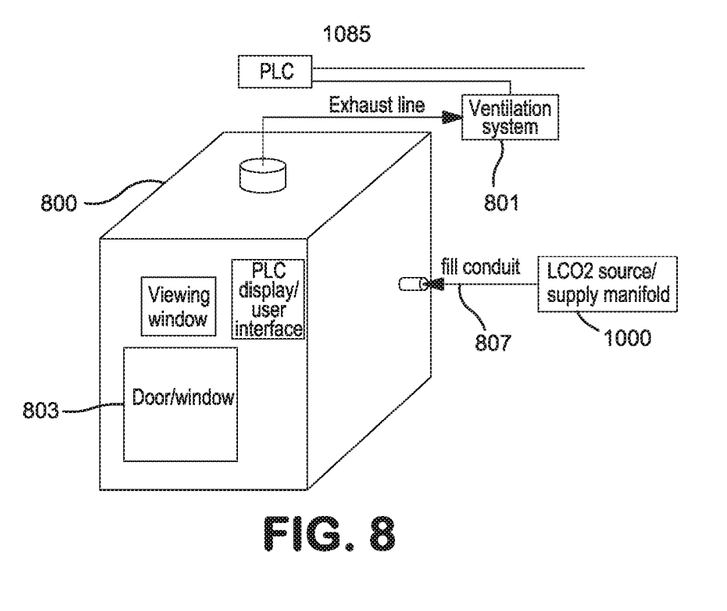
FIG. 8 shows a charging station into which a container can be loaded for automatically charging CO2 snow block.

In another embodiment, as an alternative to using an automatic dispensing station 1, a method of automatically charging CO2 snow block into a single container within a charging station can be carried out. FIG. 6 shows the associated control methodology 6000, and FIG. 8 shows an exemplary charging station 800. The inlet of the charging station 800 is connected to the CO2 supply manifold 1000 and the outlet of the charging station 800 is connected to ventilation system 801. The CO2 supply manifold 1000 is substantially identical with the exception that the automatic dispensing station 1 is now replaced with the charging station of FIG. 8. PLC 1085 is in electrical communication with charging station 800, CO2 supply manifold 1000, ventilation system 801 and associated components thereof. Having activated PLC 1085 (step 600), a container is selected for filling (step 601). The container may be any suitable box into which CO2 snow block can be charged. The container is placed within the charging station 800 (step 602). As described hereinbefore, pre-fill integrity checks (step 603) are performed by PLC 1085. As an additional pre-fill integrity check, a door sensor determines if door 803 is locked. Failure to satisfy any of the pre-fill integrity checks will prompt PLC 1085 to generate an appropriate HMI message for the user to take appropriate action (step 604).

When all pre-fill integrity checks are completed, the container is activated from the idle orientation into the filling orientation (step 605). By way of example and not intending to be limit, the fill orientation can include configuring a top plate onto the top of container by one or more vertical actuators which are placed onto the top of container to create a seal along the periphery. It should be understood that the container need not utilize a top plate and mold cavity as described with reference to FIGS. 1a, 1b, 2a and 2b. Accordingly, if a top plate and mold cavity as described hereinbefore is not needed, the fill orientation can include introducing and orienting a suitable charger which is operably connected to the fill conduit and top of container. The filling orientation also provides safety interlocks that are provided in the charging station 800 so that the door 803 remains locked during CO2 charging, and the container is loaded in a secure manner within the interior of the charging station 800.

When the container is validated to be in a fill orientation, user can input the desired volume of CO2 snow block 2 desired to be generated within the container. At step 606, the PLC 1085 determines a predetermined fill time as described hereinbefore with respect to step 507 in the example of FIG. 5. The density of the CO2 snow block (e.g., 55-60 lb/ft3) is pre-programmed into the PLC 1085; and the mass flow rate empirically determined from a look-up table of CO2 pressure versus aggregate volume of nozzles in the charger.

A user activates a start button (step 607) to initiate the auto charge process. Filling begins as follows (step 608). A sufficient amount of gaseous CO2 from the supply manifold 1000 is introduced from the vapor headspace of CO2 source 1090 into fill conduit 807, which extends between the supply manifold 1000 and the container. The supply manifold 1000 is operably connected to the fill conduit 807. CO2 gas is added into the conduit to pressurize the conduits of manifold 1000 to a level that is sufficient to prevent the pressure of the liquid CO2 from reducing below a certain pressure (e.g., below about 150 psig) at which the liquid CO2 can prematurely undergo a phase change to solid and/or gas within the conduit of manifold 1000 and fill conduit 807. The PLC 1085 continues to monitor pressure in the supply manifold 1000 from pressure transducer 1070 (FIG. 7), which measures the pressure of CO2 and the fill conduit 807. When the pressure is determined to be at or above a certain pressure such that liquid CO2 does not change phase, the PLC 1085 transmits a signal to a control valve 1200 to configure it into the open position. With the control valve 1200 in the open position, liquid CO2 from CO2 supply 1090 is withdrawn and flows along conduit 1092. The pressure of the liquid CO2 is higher than that of the gaseous CO2 occupying the manifold 1000; as a result, gas flow of CO2 into the container stops as liquid CO2 flows into the container of charging station 800 along a first direction (e.g., substantially vertical and downwards into container). As the CO2 liquid enters container, it undergoes a phase change to transform into CO2 snow block and off-gas. The off-gas escapes container and vents through exhaust conduit 1050. CO2 liquid continues to enter container until the PLC 1085 determines that the elapsed fill time has reached the predetermined time. When the elapsed time has reached the predetermined time, PLC 1085 relays a signal to control valve 1200 to configure it into the closed position, thereby stopping withdrawal of liquid CO2 from the CO2 source 1090 (step 610). Main liquid withdrawal valve 1093 is also closed. In response to stopping flow of liquid CO2, gaseous CO2 can resume to flow along gas conduit 1091 and into fill conduit 807 and into container, if desired, for a certain duration as a means for purging any impurities or residuals within conduit of manifold 1000 and/or container. As the CO2 gas flows into the container and then vents into exhaust conduit 1050, the snow block may become more packed. It should be understood that while valve 1093 and valve 1094 are shown as manual valves in FIG. 7, automatic control valves can be used in place of each of the valves 1093 and 1094.

Shut down can now be performed (step 611). Residual liquid CO2 may be entrapped along the portion of liquid conduit 1092 extending from the control valve 1200 to the main liquid withdrawal valve 1093. Safety relief valves 1086 and 1087 ("SRV 1102" and "SRV 1200") are designed to relieve residual pressure that may be entrapped within gas conduit 1091 and/or liquid conduit 1092 when various system components of charging station 800 and manifold 1000 are shut down. As the trapped liquid CO2 therealong can eventually sublime into CO2 gas, the pressure buildup can be relieved by the safety relief valve 1087, which in one example is set to actuate at 400 psig. The safety relief valve 1086 also serves to relieve pressure if and when the pressure buildup in the CO2 gas 1091 conduit reaches an upper limit (e.g., 400 psig).

After shutdown has been completed at step 611, the PLC 1085 deactivates the safety interlocks of charging station 800 so that door 803 of charging station can be opened to access container and remove container with the CO2 snow block 2 filled therein.

It should be understood that the automated charging into a container can also occur based on other criteria. For example, the PLC 1085 can use another set point for filling, including, by way of example, a pre-defined weight of the CO2 snow block 2; a pressure in the container; a capacitance of the CO2 snow block 2; a temperature in the container; or a deformation of a top plate which may be utilized to seal the container.

While the container with CO2 snow block 2 as has been described can be used with any "item" as defined herein below, in a preferred embodiment, the present invention is especially conducive for maintaining compliance with the packaging protocols required to reproducibly preserve biological samples, thereby avoiding sample degradation and allowing the samples to revert back to its functional state and be subject to applicable testing upon arrival to its destination site. Further, the CO2 snow block 2 is preferably generated with improved packing density that can hold the requisite temperature of the container with extended cooling effect duration in comparison to standard dry ice shipping containers containing CO2 dry ice produced by conventional techniques. The extended cooling effect duration can reduce the risk of sample degradation in transport and allow the user more flexibility to optimize cost and convenience regarding preparation and assembly of transportable containers of the present invention; when items (including samples, such as biological samples) are acquired; and the types of shipping methods that can be utilized.

Numerous modifications to the present invention are contemplated without departing from the spirit of the present invention. For example, the sequence of steps in the control methodology for the automated filling station (FIG. 5) can be altered such that box 22 is positioned in place after pre-fill integrity checks pass. With respect to the charging station (FIG. 6), the PLC can be activated after the container is loaded into charging station. Additionally, the injection direction of CO2 streams into the selected container can be varied. For instance, the CO2-containing liquid may be injected upwards; or laterally; or downward at various angle orientations, with the exact angle determined by the nozzle shape, design, and geometry in the fill conduit. Similarly, the CO2 gas and off gas within selected container can be varied so as to vent in a downward direction or a lateral direction or an upward and angled direction. Additionally, with respect to the auto charging station, the control methodology can be modified so that the user inputs the volume of snow block 2 and selects the container which is listed on the HMI of the automatic dispensing station 1.

The automated control methodology of the present invention can be applied to any container. In one embodiment, the automated control methodology and process can be used in connection with a container as described in Serial application Ser. No. 15/645,152, the details of which are incorporated herein by reference in its entirety for all purposes. Such container can be utilized as part of the automatic fill dispensing station or charging system of the present invention.

While it has been shown and described what is considered to be certain embodiments of the invention, it will, of course, be understood that various modifications and changes in form or detail can readily be made without departing from the spirit and scope of the invention. It is, therefore, intended that this invention not be limited to the exact form and detail herein shown and described, nor to anything less than the whole of the invention herein disclosed and hereinafter claimed.

The invention claimed is:

1. A method of automatically filling carbon dioxide (CO2) snow block into a container within an automatic dispensing station, comprising:
   receiving a first signal corresponding to a pressure of liquid CO2 into a controller as a first set point;
   inputting into the controller a volume of the CO2 snow block to be generated as a second set point;
   the controller determining a fill time to generate the volume of the CO2 snow block based on the first set point and the second set point;
   the controller selecting the container with an interior volume corresponding to the second set point, said container located within the automatic dispensing station, and said automatic dispensing station comprising two or more containers of different interior volumes;
   flowing a gaseous CO2 into a fill conduit prior to flowing said liquid CO2, said gaseous CO2 pressurizing the fill conduit at or above a pressure sufficient to prevent a phase change of the liquid CO2 that is subsequently introduced into the container;
   the controller causing a liquid CO2 control valve to allow the liquid CO2 to flow along the fill conduit and into the container when the controller determines the pressure in the fill conduit is at or above the pressure sufficient to prevent the phase change of the liquid CO2;
   introducing said liquid CO2 into the container;
   at least a portion of said liquid CO2 undergoing a phase change to transform into said CO2 snow block and offgas CO2 within the container;
   withdrawing said offgas CO2 from the container through a plate permanently affixed or removably affixed to the container, said plate permeable to the offgas CO2 and at least partially impermeable to a solid phase CO2;
   measuring an elapsed time of filling the container with the liquid CO2 and generating a second signal corresponding to the elapsed time;
   transmitting the second signal corresponding to the elapsed time to the controller;
   the controller (i) allowing said liquid CO2 to continue to flow into the container, in the absence of an override, when the elapsed time is less than the fill time, and (ii) preventing said liquid CO2 to flow in the container when the elapsed time has reached the fill time.

2. The method of claim 1, further comprising:
   the controller detecting the elapsed time to reach the fill time; and in response thereto
   the controller transmitting a third signal to configure the container from a filling orientation into a dispensing orientation, said container in the dispensing orientation containing the volume of the CO2 snow block.

3. The method of claim 2, further comprising:
   releasing the CO2 snow block from the container into an access region of the automatic dispensing station.

4. The method of claim 3, further comprising:
   configuring the container into an idle orientation or the filling orientation within the automatic dispensing station.

5. The method of claim 1, further comprising the plate positioned with sufficient pressure onto the container to form a seal along the periphery of the container.

6. The method of claim 1, further comprising:
   introducing said liquid CO2 into the container without incurring substantial blockage of said liquid CO2.

7. The method of claim 1, further comprising:
   the controller performing integrity checks prior to performing the step of flowing the sufficient amount of gaseous CO2 into the fill conduit.

8. The method of claim 1, wherein the controller is configured to actuate the container from an idle orientation into a filling orientation.

9. A method of automatically filling carbon dioxide (CO2) snow block into a container within an automatic dispensing station and vending said CO2 snow block from the selected container, comprising:
   inputting into a controller a set point to be used for determining completion of fill of CO2 snow block into the container, said set point based on i) fill duration; (ii) a pre-defined weight of the CO2 snow block, (iii) a pressure in the selected container, (iv) a capacitance of the CO2 snow block, (v) a temperature in the container or (vi) a deformation of a plate, said plate permanently affixed or removably affixed to the container;
   the controller receiving a volume of the CO2 snow block to be generated;
   the controller selecting the container having an interior volume that is capable of receiving the volume of the CO2 snow block to be generated, said container located within the automatic dispensing station comprising two or more containers of different interior volumes;
   flowing a sufficient amount of gaseous CO2 prior to flowing liquid CO2 into and along a fill conduit to pressurize the fill conduit to a pressure at which the liquid CO2 that is subsequently introduced into the container does not undergo a phase change into solid and/or gas within the fill conduit;
   the controller determining the pressure in the fill conduit is at or above the pressure to prevent the phase change of the liquid CO2; and in response thereto,
   the controller transmitting a first signal to a liquid CO2 control valve to cause the liquid CO2 to flow along the fill conduit and into the container and therein undergo a phase change to transform into CO2 snow block and offgas CO2;
   withdrawing said offgas CO2 from the selected container through the plate, said plate permeable to the offgas CO2 and at least partially impermeable to a solid phase CO2, and further wherein said fill conduit is operably connected to the container;
   measuring a real-time variable corresponding to the set point and generating a second signal corresponding to the real-time variable;
   transmitting the second signal to the controller;
   the controller (i) allowing said liquid CO2 to continue to flow into the container, in the absence of an override, when determining the real-time variable has not reached the set point; and
   the controller (ii) preventing said liquid CO2 to flow in the container when the real-time variable has reached the set point, and in response thereto, the controller transmitting a third signal to configure the container into a dispensing orientation, said container in the dispensing orientation containing the volume of the CO2 snow block.

10. The method of claim 9, further comprising:
    the controller performing integrity checks prior to initiating the automated filling of the CO2 snow block into the container.

11. The method of claim 9, wherein the controller receives the second signal corresponding to the real-time variable equal to the set point, and in response thereto, said controller transmits a fourth signal to the liquid CO2 control valve to configure the liquid CO2 control valve into a closed position.

12. The method of claim 9, further comprising the controller validating that the container is in a filling orientation, and if said controller determines the container is not in the filling orientation, the controller either (i) transmitting one or more signals to cause the container to actuate into the filling orientation, or (ii) transmitting an alert notification for a user to manually configure the container into the filling orientation.

13. A method of automatically charging carbon dioxide (CO2) snow block into a container, comprising:
inputting into a controller a set point to be used for determining completion of fill of the CO2 snow block into the container, said set point based on i) fill duration; (ii) a pre-defined weight of the CO2 snow block, (iii) a pressure in the container, (iii) a capacitance of the CO2 snow block, (v) a temperature in the container or (vi) a deformation of a plate, said plate permanently affixed or removably affixed to the container;
the controller performing integrity checks and determining said integrity checks to meet applicable criteria; and in response thereto,
flowing a sufficient amount of gaseous CO2 prior to flowing liquid CO2 from a supply manifold into the fill conduit to pressurize the fill conduit to a pressure at which the liquid CO2 that is subsequently introduced into the container does not undergo a phase change into solid and/or gas within the fill conduit;
the controller receiving a first signal corresponding to the pressure in the supply manifold and the fill conduit;
the controller transmitting a second signal to a liquid CO2 control valve situated along the supply manifold to configure the liquid CO2 valve into the open position when the controller determines the first signal corresponding to the pressure in the supply manifold and the fill conduit is at or above a pressure sufficient to prevent a phase change of liquid CO2;
withdrawing the liquid CO2 from a CO2 source into the supply manifold at a pressure higher than that of the gaseous CO2, thereby stopping flow of the gaseous CO2 through the fill conduit, said CO2 source operably connected upstream of the supply manifold;
introducing the liquid CO2 into the container through the fill conduit;
the CO2 liquid undergoing a phase change to transform into said CO2 snow block and offgas CO2 within the container;
withdrawing said offgas CO2 from the container;
measuring a real-time variable corresponding to the set point and generating a third signal corresponding to the real-time variable;
transmitting the third signal corresponding to the real-time variable to the controller;
wherein said liquid CO2 continues to enter the container, in the absence of an override, until the controller determines the real-time variable to reach the set point.

14. The method of claim 13, further comprising:
the controller receiving the third signal corresponding to the real-time variable having a value equal to the set point; and in response thereto
the controller transmitting a fourth signal to the liquid CO2 control valve in the supply manifold to configure the liquid CO2 valve into the closed position to stop withdrawal of the liquid CO2 from the CO2 source into the supply manifold.

15. The method of claim 13, further comprising:
loading the container into a charging station;
operably connecting the container to the fill conduit; and
operably connecting the container to an exhaust.

16. The method of claim 15, further comprising the step of the controller performing the integrity checks, and in response thereto, preventing the automatic charging of the gaseous CO2 and the liquid CO2 into the container when the controller determines (a)(i) an exhaust is not operating; or (a)(ii) an access door to the charging station is not closed; or (a)(iii) the pressure in the fill conduit and the supply manifold is below the threshold pressure sufficient to prevent the phase change of liquid CO2; or
the controller performing the integrity checks, and in response thereto, allowing the automatic charging of CO2 snow block into the container to proceed when the controller determines (b)(i) the exhaust is operating; and (b)(ii) the access door to the charging station is closed; and (b)(iii) the pressure in the fill conduit and the supply manifold is at or above the pressure sufficient to prevent the phase change of the liquid CO2.

17. The method of claim 13, further comprising validating the container is in a filling orientation, and if the container is determined to not be in the filling orientation, said controller either (i) transmitting one or more signals to cause the container to actuate into the filling orientation, or (ii) transmitting an alert notification for a user to manually configure the container into the filling orientation.

18. The method of claim 15, wherein said container comprises getter material situated within one or more walls of the container.

19. The method of claim 14, further comprising:
resuming the flow of the gaseous CO2 through the fill manifold and into the container to purge any residuals and/or impurities.

* * * * *